(12) United States Patent
Chau et al.

(10) Patent No.: US 9,766,454 B2
(45) Date of Patent: Sep. 19, 2017

(54) DUAL OUTPUT HEADLIGHT SYSTEM FOR A VEHICLE

(71) Applicant: GM GLOBAL TECHNOLOGY OPERATIONS LLC, Detroit, MI (US)

(72) Inventors: Jarvis Chau, Markham (CA); Thomas M. Forest, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 72 days.

(21) Appl. No.: 14/818,021

(22) Filed: Aug. 4, 2015

(65) Prior Publication Data

US 2017/0038582 A1    Feb. 9, 2017

(51) Int. Cl.
| | |
|---|---|
| G02B 27/01 | (2006.01) |
| F21S 8/10 | (2006.01) |
| B60Q 1/14 | (2006.01) |
| F21V 3/04 | (2006.01) |
| G02F 1/33 | (2006.01) |
| G02B 27/00 | (2006.01) |
| B60Q 1/08 | (2006.01) |

(Continued)

(52) U.S. Cl.
CPC ......... *G02B 27/0101* (2013.01); *B60Q 1/085* (2013.01); *B60Q 1/143* (2013.01); *F21S 48/1131* (2013.01); *F21S 48/1145* (2013.01); *F21S 48/1731* (2013.01); *F21S 48/1757* (2013.01); *F21V 3/0481* (2013.01); *G02B 27/0093* (2013.01); *G02F 1/33* (2013.01); *G09G 3/001* (2013.01); *G09G 3/3406* (2013.01); *B60Q 2300/23* (2013.01); *B60Q 2300/41* (2013.01); *B60Q 2300/45* (2013.01); *B60Q 2400/50* (2013.01); *G02B 2027/0112* (2013.01); *G02B 2027/0145* (2013.01); *G02B 2027/0187* (2013.01); *G09G 2310/0235* (2013.01)

(58) Field of Classification Search
None
See application file for complete search history.

(56) References Cited

U.S. PATENT DOCUMENTS

| 6,730,913 B2 | 5/2004 | Remillard et al. |
|---|---|---|
| 7,315,241 B1 | 1/2008 | Daily et al. |
| | (Continued) | |

FOREIGN PATENT DOCUMENTS

WO    WO2014121315    8/2014

OTHER PUBLICATIONS

Cheng, Hui-Chuan, et al., "Color Breakup Suppression in Field-Sequential Five-Primary-Color LCDs", Jrnl. of Display Tech., vol. 6, No. 6, Jun. 2010, pp. 229-234.

*Primary Examiner* — Tony N Ngo
(74) *Attorney, Agent, or Firm* — Harness, Dickey & Pierce, P.L.C.

(57) ABSTRACT

A dual output headlight system includes a projection system having a laser light source to emit incoherent light. The projection system also has a partitioned display surface including a headlight display section and a selectively active augmented display section. The partitioned display surface is positioned in a first path of the incoherent light from the laser light source and to generate a display output. The dual output headlight system also includes an optical splitter positioned in a second path of the display output to split the display output into a headlight illumination output and a graphical output.

23 Claims, 11 Drawing Sheets

(51) Int. Cl.
*G09G 3/00* (2006.01)
*G09G 3/34* (2006.01)

(56) References Cited

U.S. PATENT DOCUMENTS

| | | | |
|---|---|---|---|
| 2006/0268241 A1* | 11/2006 | Watson | H01S 5/141 353/94 |
| 2008/0198372 A1* | 8/2008 | Pan | B60Q 1/38 356/121 |
| 2010/0253598 A1* | 10/2010 | Szczerba | G01S 13/723 345/7 |
| 2014/0253882 A1 | 9/2014 | King et al. | |
| 2014/0267415 A1 | 9/2014 | Tang et al. | |
| 2014/0327946 A1 | 11/2014 | van Lierop et al. | |
| 2015/0055668 A1 | 2/2015 | Weber et al. | |
| 2015/0109537 A1 | 4/2015 | Kompanets et al. | |
| 2015/0124430 A1 | 5/2015 | Mehl | |
| 2015/0149079 A1 | 5/2015 | Breed | |
| 2015/0262240 A1* | 9/2015 | Richardson | G06Q 30/0267 705/14.64 |

\* cited by examiner

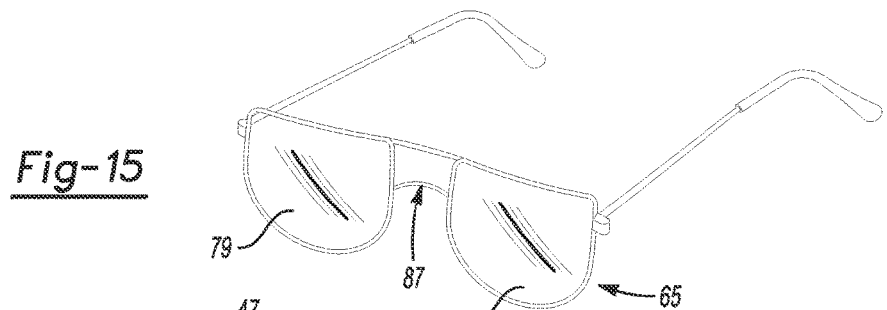
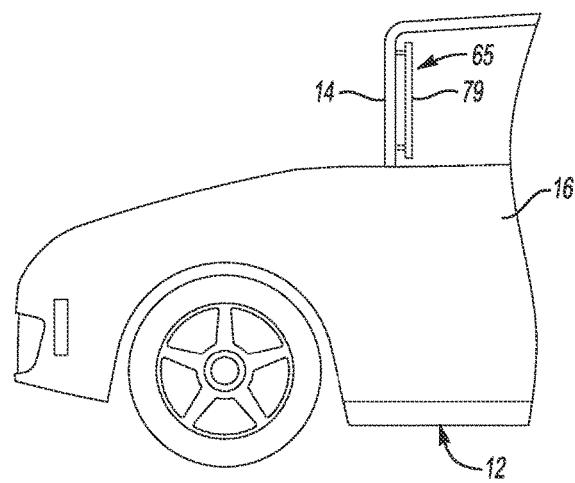
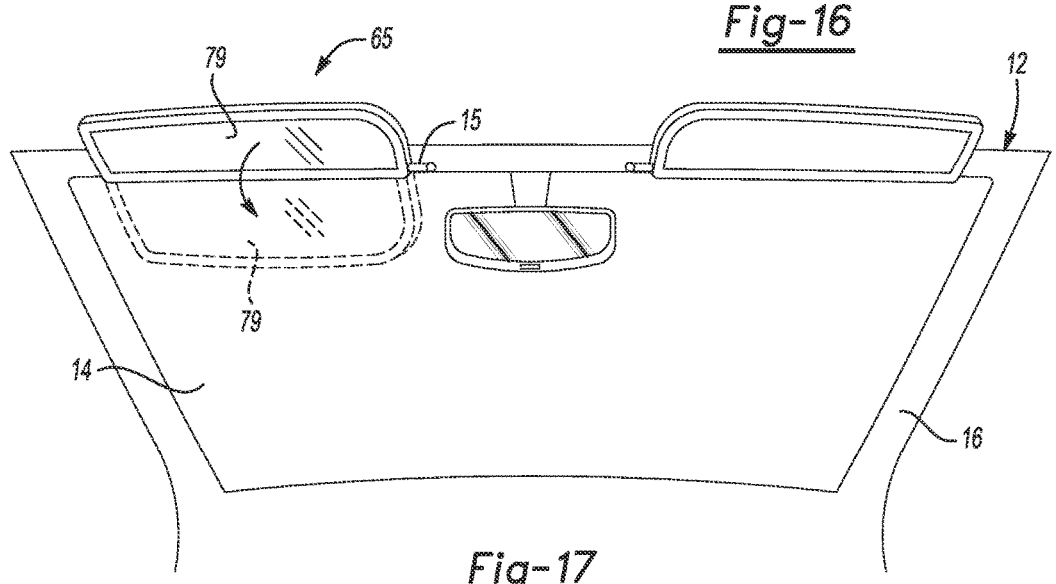

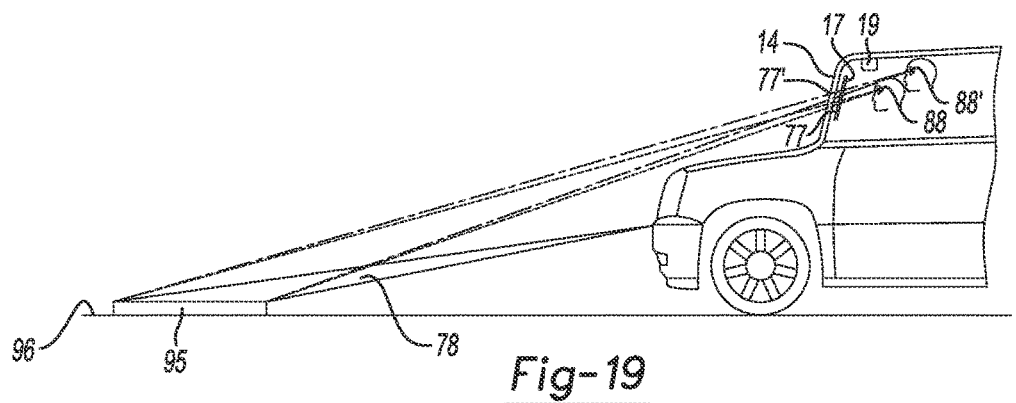
*Fig-19*
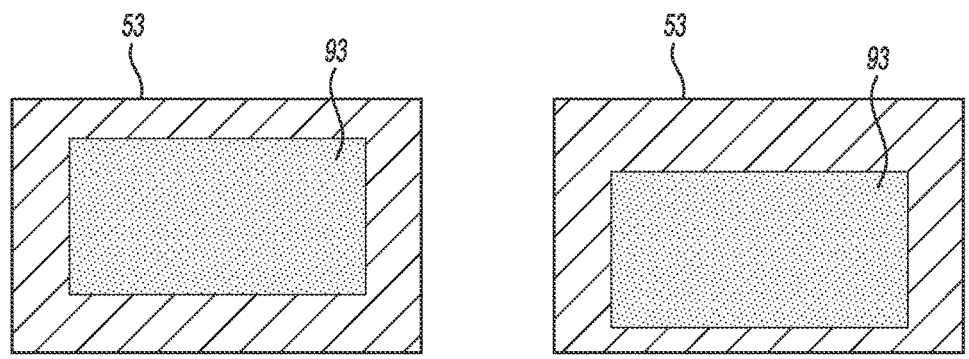
*Fig-20A*  *Fig-20B*
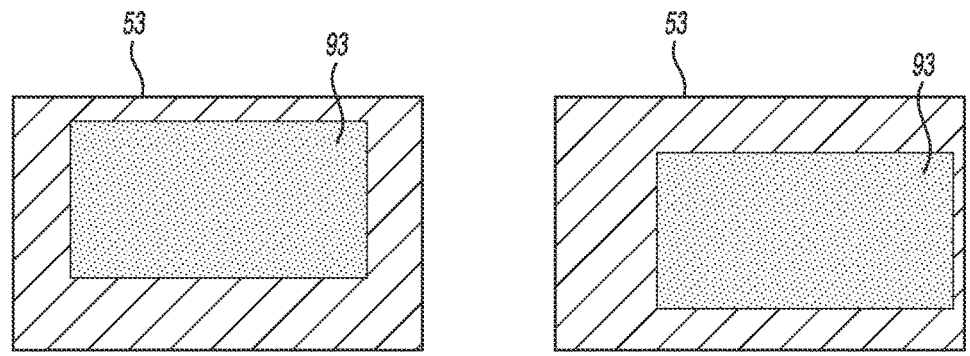
*Fig-20C*  *Fig-20D*
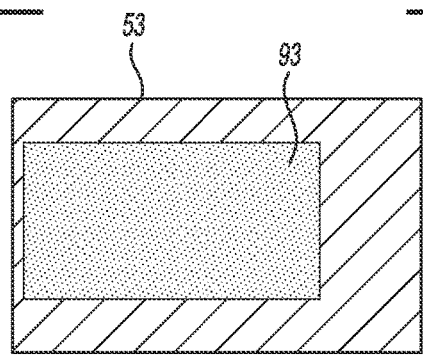
*Fig-20E*

DUAL OUTPUT HEADLIGHT SYSTEM FOR A VEHICLE

BACKGROUND

Automobile headlight systems typically have a low beam mode and a high beam mode. The low beam mode and the high beam mode are configured to have an intensity focus and direction to provide an appropriate level of illumination for the driver without interfering with the vision of drivers of oncoming vehicles. In some headlight systems, the low beam mode is accomplished by a pair of low beam lamps, and the high beam mode is accomplished by a pair of high beam lamps. Other headlight systems combine the low beam and high beam lamps into combination lamps that can produce low beam illumination or high beam illumination by selecting a respective filament having a different location relative to a fixed reflector.

Some existing automobile headlight systems provide enhanced high beams. Such headlight systems use cameras to detect other vehicles and automatically dim the portions of the high beam that may be dazzling to drivers of the other vehicles. Thus, the high beams illuminate the road without interfering with the vision of oncoming drivers. In some of the existing headlight systems, shutters mask a portion of the high beam. Other headlight systems have a matrix of LED (light emitting diode) bulbs, with each one shining in a specific direction. When a camera detects an approaching vehicle, some of the bulbs turn off independently to dim portions of the high beam.

SUMMARY

A dual output headlight system includes a projection system having a laser light source to emit incoherent light. The projection system also has a partitioned display surface including a headlight display section and a selectively active augmented display section. The partitioned display surface is positioned in a first path of the incoherent light from the laser light source and to generate a display output. The dual output headlight system also includes an optical splitter positioned in a second path of the display output to split the display output into a headlight illumination output and a graphical output.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 14C is a timing diagram depicting the timing of a frame with 3 sub-frames, each having a masked interval and a visible interval according to the present disclosure;

FIG. 15 is a semi-schematic perspective view of an example of an active shutter system including a window having transparent media and a MEMS shutter array or a liquid crystal layer disposed on the transparent media with the window supported by an eyeglass frame;

FIG. 16 is a semi-schematic perspective view of an example of an active shutter system including a window having transparent media and a MEMS shutter array or a liquid crystal layer disposed on the transparent media with the window supported by a windshield of the vehicle according to the present disclosure;

FIG. 17 is a semi-schematic perspective view of an example of an active shutter system including a window having transparent media and a MEMS shutter array or a liquid crystal layer disposed on the transparent media with the window rotatably supported by a visor support attached to a body of the vehicle according to the present disclosure;

FIG. 19 is a semi-schematic diagram depicting an apparent change in position of a projected object caused by different driver eye positions in a vehicle according to the present disclosure; and FIGS. 20A-20E are semi-schematic diagrams depicting examples of cropped and shifted images by using a sub-array of the total pixels available in the selectively active augmented display section on the pixel array generator and shifting the center of the sub-array according to the present disclosure.

DETAILED DESCRIPTION

Figure 1:
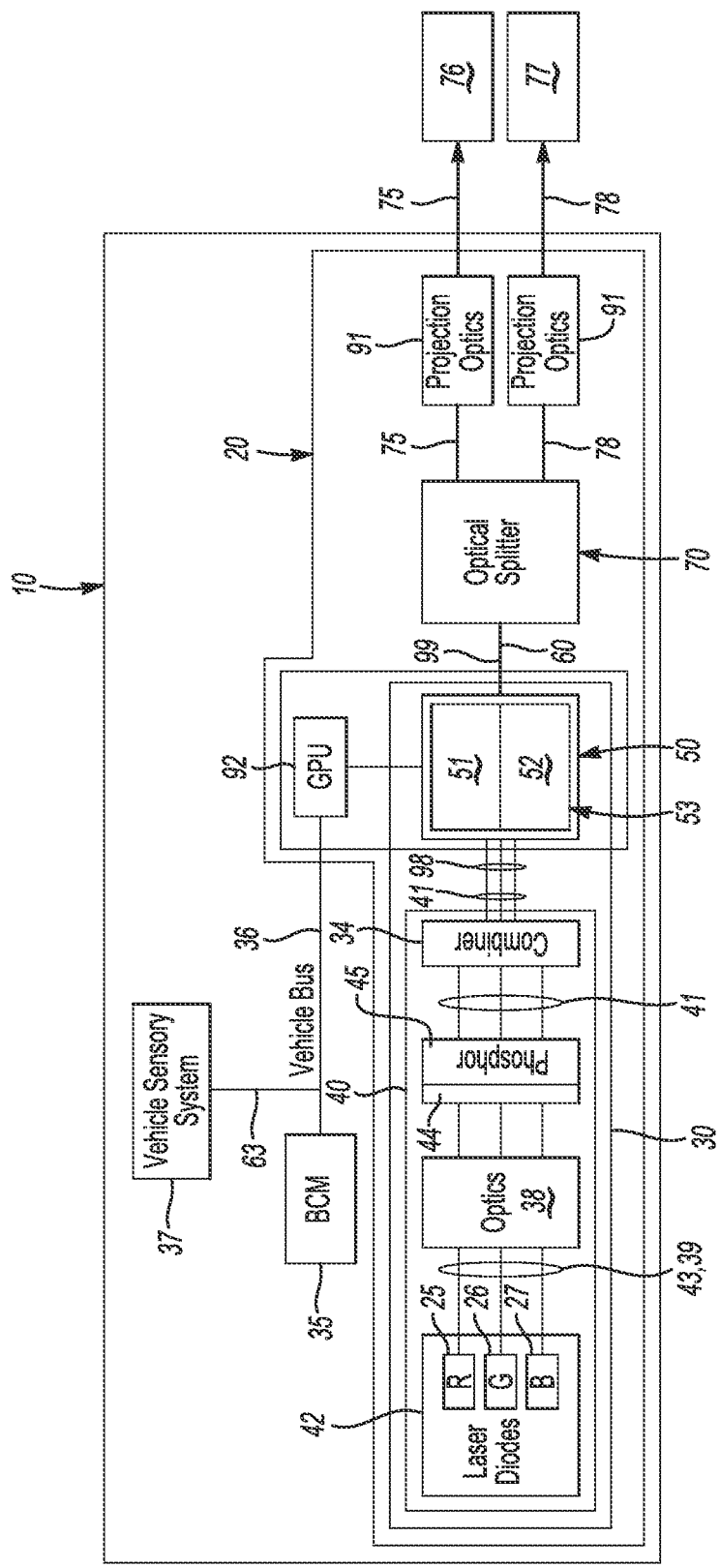
FIG. 1 is a block diagram depicting an example of a dual output headlight system for a vehicle according to the present disclosure.

The present disclosure includes a dual output headlight system with both headlight illumination output and a graphical output. The headlight illumination output illuminates the pathway in front of the vehicle. The graphical output is projected below the headlamp illumination output to provide graphical images, with a full color gamut, to enhance the natural scene and provide graphical information to the vehicle driver. For example, objects and painted surface markings may be outlined; unlit side streets may be marked; and road names, distance indicators, and route cues may be projected onto the road. In an example of a route cue, an arrow can be projected onto a road at an intersection to mark a turn on a route using information from a navigation system. The graphical output from the dual output headlight system may be integrated or coordinated with a Head-Up Display (HUD); however, graphical output from the dual output headlight system may be used on a vehicle without a HUD. It is to be understood that the graphical output is projected below the headlamp illumination output, whether the headlamp illumination output is in a high beam mode or a low beam mode. The low beam illumination output is distinguished from the graphical output.

In examples of the present disclosure, the headlight illumination output and the graphical output ultimately receive light from the same laser diodes. The laser diodes may produce coherent light. Coherent light may cause anomalies such as speckle. In examples of the present disclosure, the coherent light from the laser diodes is used to pump phosphors that emit incoherent light. As used herein, the laser light source includes the laser diodes and the phosphor; therefore, the laser light source emits incoherent light. To clarify, the laser diodes may emit coherent light, which is converted to incoherent light by the phosphor. Together, the laser diodes and the phosphor are part of the laser light source that emits incoherent light. Using the same laser light source and a partitioned display surface for both the headlight illumination output and the graphical output, benefits in reduced system cost and reduced package space may be realized via examples of the present disclosure.

The graphical output of the present disclosure may achieve a large gamut of color by using additive color. Additive color is color created by mixing a number of different light colors. Red, green, and blue are the primary colors normally used in additive color systems. By controlling the relative amounts of red, green, and blue light that reach a human eye, the eye with normal color vision ability can be caused to perceive a wide range of colors. For example, a combination of red and green light viewed together in equal proportions is perceived as yellow. Not being held bound to any theory, it is believed that additive color is a result of the way the eye detects color, and is not a property of light. To illustrate, pure spectral yellow light, with a wavelength of about 580 nm, is different from a mixture of red and green light. However, both pure spectral yellow light and the mixture of red and green light stimulate the eye in a similar manner; therefore the eye does not detect the difference between pure spectral yellow light and the mixture of red and green light.

The primary additive colors may be mixed in several ways. One way to mix primary additive colors is by proximity. By placing sub-pixels of the primary colors close together, the sub-pixels overlap and blend on the retina of the eye when viewed by the eye at a normal distance. Color television and computer monitors have applied the sub-pixel method in CRTs (cathode ray tubes) and LCDs (liquid crystal displays). Another method of blending primary additive colors is external superimposition. In external superimposition, the primary additive colors simultaneously illuminate a surface to be perceived by the eye simultaneously. For example, theatrical lighting at plays and concerts may apply external superimposition of primary additive colored lights. A third method of blending primary additive colors is to temporally mix the colors by illuminating the surface with each individual primary additive color in a sequence of pulses that is so rapid, the eye/brain cannot detect the individual pulses and sees the mixture of colors.

The full gamut of color available in any additive color system is defined by all the possible combinations of all the possible luminosities of each primary color in that system. The gamut may be modeled in chromaticity space as a plane convex polygon with corners at the primary colors. For three primary additive colors, the gamut is a triangle in chromaticity space.

As used herein, red means the color at the end of the spectrum of visible light next to orange and opposite violet. The color red is evoked by light with a predominant wavelength of about 620 nm to about 740 nm. For example, red light may be generated by a laser diode with a predominant wavelength of about 671 nm.

As used herein, green means the color between blue and yellow on the spectrum of visible light. The color green is evoked by light with a predominant wavelength of about 495 nm to about 570 nm. For example, green light may be generated with a predominant wavelength of 532 nm using diode pumped solid state (DPSS) technology.

As used herein, blue is the color between violet and green on the spectrum of visible light. The color blue is evoked by light with a predominant wavelength from about 445 nm to about 495 nm. For example, blue light may be generated by a laser diode with a predominant wavelength from about 445 nm to about 447 nm.

As used herein, frame rate is the frequency (rate) at which an imaging device displays consecutive images called frames. The term "frame rate" is typically used in applications of film and video cameras, computer graphics, and motion capture systems. Frame rate is expressed in frames per second (FPS) or Hertz (Hz).

Without being bound to any theory, it is believed that the human visual system can process about 11 separate images per second, perceiving the images individually. The threshold of human visual perception varies depending on what is being measured. A brief interruption of darkness may be noticed on a lighted display if the interruption is about 16 milliseconds or longer. Persistence of vision in the visual cortex causes a very short, single-millisecond visual stimulus to be perceived as having a duration of between 100 ms and 400 ms. Persistence of vision may cause images perceived in this duration to appear as one stimulus, such as a 10 ms green flash of light immediately followed by a 10 ms red flash of light perceived as a single yellow flash of light.

Figure 2:
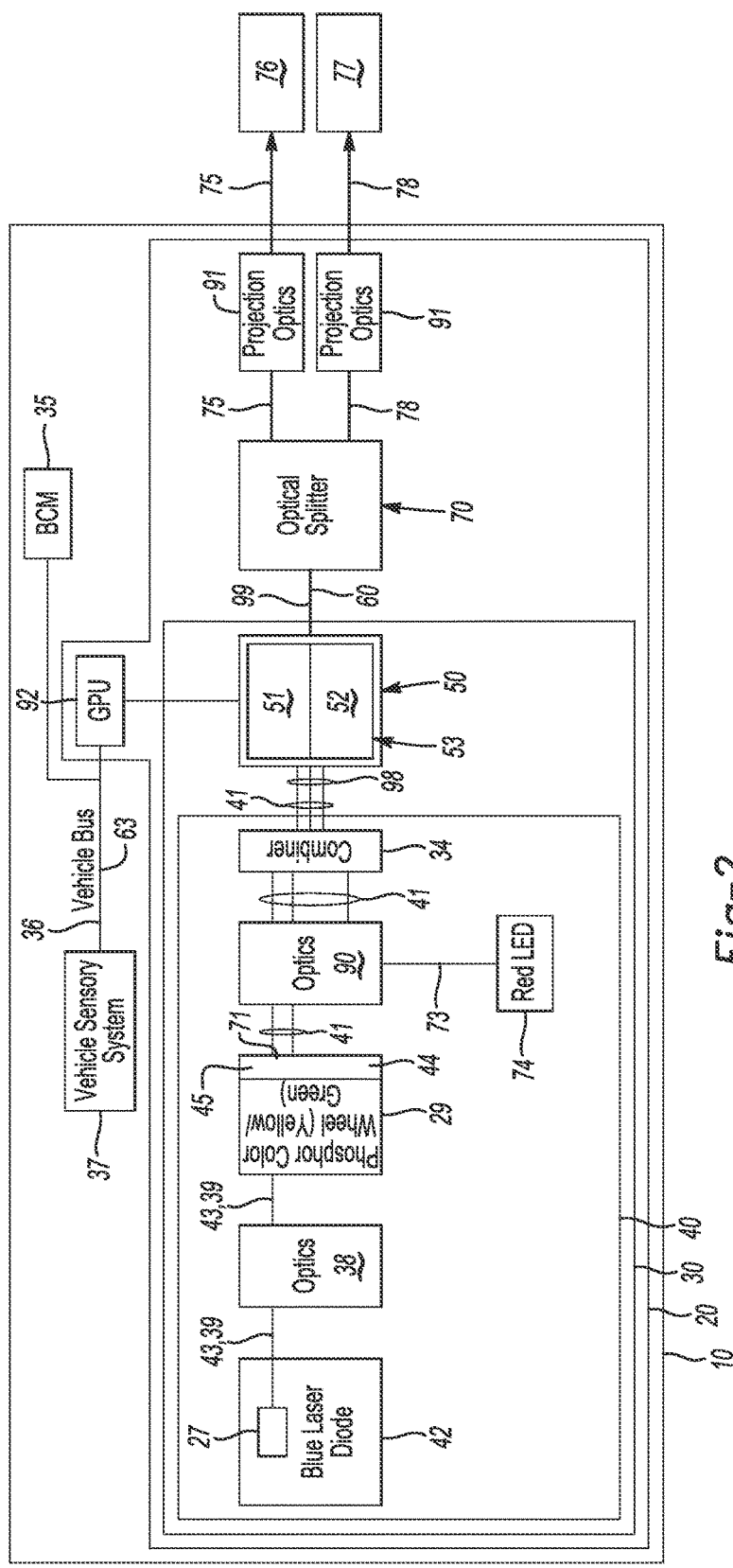
FIG. 2 is a block diagram depicting another example of a dual output headlight system for a vehicle according to the present disclosure.
Figure 3:
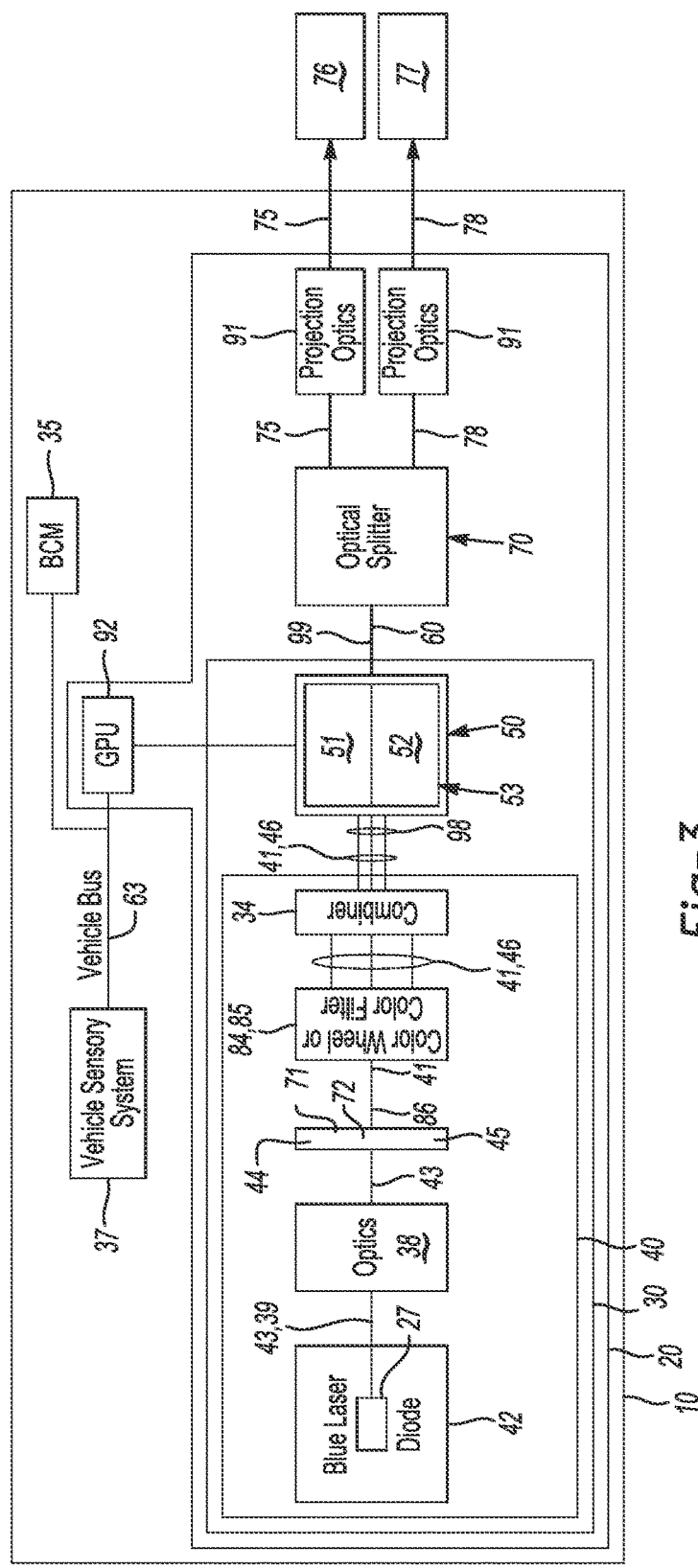
FIG. 3 is a block diagram depicting yet another example of a dual output headlight system for a vehicle according to the present disclosure.

FIGS. 1-3 are block diagrams depicting a vehicle system 10 of the present disclosure. The vehicle system 10 includes an automotive vehicle 12. A body control module (BCM) 35 may be operatively disposed on the vehicle 12. A vehicle sensory system 37 may be operatively disposed on the vehicle 12. A vehicle bus 36 may operatively connect the BCM 35 and the vehicle sensory system 37. The vehicle system 10 includes a dual output headlight system 20. The dual output headlight system 20 may be responsive to commands from the BCM 35. The dual output headlight system 20 includes a projection system 30. The projection system 30 includes a laser light source 40 to emit incoherent light 41. The projection system 30 also includes a partitioned display surface 50 having a headlight display section 51 and a selectively active augmented display section 52. The selectively active augmented display section 52 may be responsive to object distance data 63 obtained by the vehicle sensory system 37. The partitioned display surface 50 is positioned in a first path 98 of the incoherent light 41 to receive the incoherent light 41 from the laser light source 40 and to generate a display output 60. The dual output headlight system 20 includes an optical splitter 70 positioned in a second path 99 of the display output 60 to split the display output 60 into a headlight illumination output 75 and a graphical output 78. The display output 60 may include the headlight illumination output 75 from the headlight display section 51 and graphical information 61 conveyed by the graphical output 78. The dual output headlight system 20 may be to illuminate a zone 76 with white light from the headlight illumination output 75 and to project the graphical output 78 as an image 77 projected below the zone 76 with white light.

The laser light source 40 may include a laser light generator 42 to generate laser light 43. In the example depicted in FIG. 1, the laser light generator 42 includes a red laser diode 25, a green laser diode 26, and a blue laser diode 27. The laser diodes 25, 26, 27 output laser light 43, which may be coherent light 39 that is directed by laser light source optics 38 to a laser light-responsive phosphor 45. The laser light source optics 38 may include a mirror, a lens, a prism, collimator, a light pipe, or any other device that directs light by reflection, refraction, or diffraction. The laser light source 40 may also include a film layer 44 having a laser light-responsive phosphor 45 deposited thereon wherein the phosphor 45 is to emit the incoherent light 41 in response to excitation by the laser light 43.

In the example depicted in FIG. 1, the incoherent light 41 emitted by the phosphor 45 is acted upon by a combiner 34. The combiner 34, may, for example, focus the incoherent light 41 that is emitted by various sections of the phosphor 45 to a single location.

In the example depicted in FIG. 2, the laser light generator 42 includes a blue laser diode 27. The blue laser diode 27 outputs laser light 43, which may be coherent light 39 that is directed by laser light source optics 38 to a laser light-responsive phosphor 45. The laser light source optics 38 may include a mirror, a lens, a prism, collimator, a light pipe, or any other device that directs light by reflection, refraction, or diffraction. The laser light source 40 may have a phosphor color wheel 29 with a film layer 44 having a laser light-responsive phosphor 45 deposited thereon. The phosphor 45 may be a yellow-green phosphor 71 that emits yellow-green incoherent light 41 in response to excitation by the laser light 43. The phosphor color wheel 29 may have segments of the yellow-green phosphor 71 and have translucent segments to change the blue laser light 43 to blue incoherent light. When the phosphor color wheel is rotated, alternating pulses of yellow-green and blue incoherent light 41 are emitted/transmitted via the phosphor color wheel 29. The timing of the pulses of incoherent light 41 may be controlled by a speed of rotation of the phosphor color wheel 29. The timing of the pulses of incoherent light 41 may also be controlled by pulsing the blue laser diode 27.

In the example depicted in FIG. 2, red incoherent light 73 is generated by a red light emitting diode (LED) 74. The red incoherent light 73 is directed by combining optics 90 along with the yellow-green and blue incoherent light 41 emitted/transmitted via the phosphor color wheel 29 to the combiner 34. The combining optics 90 may include a mirror, a lens, a prism, collimator, a light pipe, or any other device that directs light by reflection, refraction, or diffraction.

In the example depicted in FIG. 3, the laser light generator 42 includes a blue laser diode 27. The blue laser diode 27 outputs laser light 43, which may be coherent light 39 that is directed by laser light source optics 38 to a laser light-responsive phosphor 45. The laser light source optics 38 may include a mirror, a lens, a prism, collimator, a light pipe, or any other device that directs light by reflection, refraction, or diffraction. The laser light source 40 may have a film layer 44 having the laser light-responsive phosphor 45 deposited thereon. The phosphor 45 may include a yellow-green phosphor 71 that emits yellow-green incoherent light 41 in response to excitation by the laser light 43. The phosphor 45 may also include a red phosphor 72 that emits red incoherent light 41 in response to excitation by the blue laser light 43. The film layer 44 may have segments of the yellow-green phosphor 71 and segments of the red phosphor 72. The film layer 44 may also have translucent segments to change the blue laser light 43 to blue incoherent light. When the red, yellow-green and blue incoherent light 41 are emitted/transmitted via the film layer 44 with the phosphor 45 deposited thereon, the combined light appears to be close to white light 86. If the yellow-green light is shifted away from green to be more yellow, the combined light will tend to appear to have a warmer, yellowish color. Color filters 84 or a color filter wheel 85 separate the incoherent light 41 into pulses 46 of red, green, and blue incoherent light 41.

In the example depicted in FIG. 3, the incoherent light 41 emitted by the phosphor 45 is acted upon by a combiner 34. The combiner 34, may, for example, focus the incoherent light 41 that is emitted by various sections of the phosphor 45 to a single location.

Figure 4:
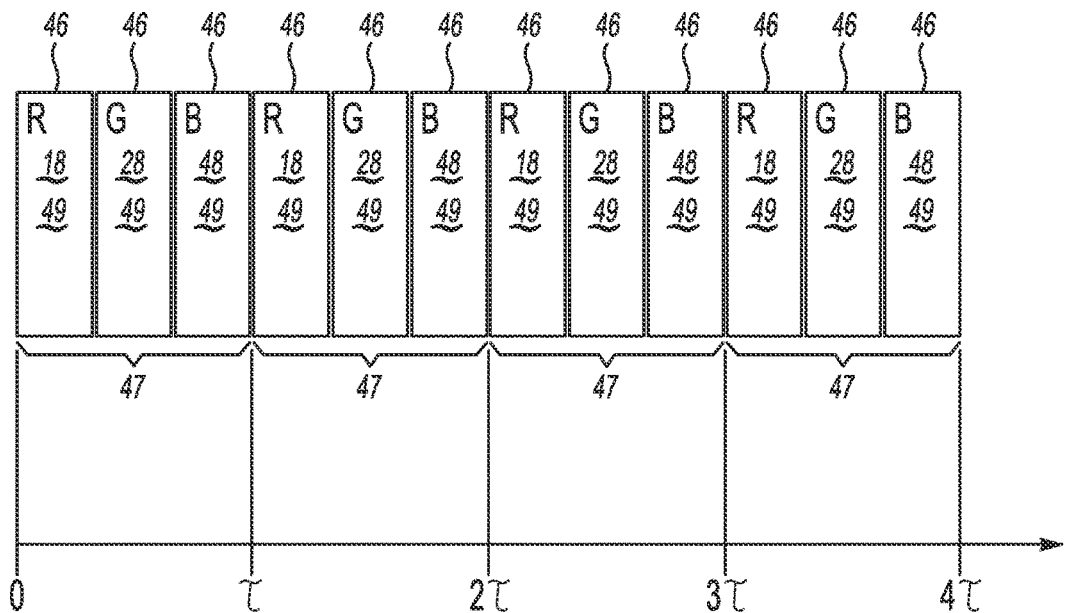
FIG. 4 is a timing diagram depicting frames and sub-frames of an example of the present disclosure.

In an example of the present disclosure, the laser light source 40 is to emit pulses 46 of the incoherent light 41. FIG. 4 is a timing diagram depicting the pulses 46 of the incoherent light 41. The pulses 46 of the incoherent light 41 are discrete pulses 49 of at least 2 primary additive colors. The pulses 46 of the incoherent light 41 are emitted in a series of frames 47 at a frame rate of at least 60 Hz. The display time T (Tau) for each frame 47 is the reciprocal of the frame rate. Each of the frames 47 may have the pulses 46 emitted in a predetermined sequence including the at least 2 primary additive colors. The predetermined sequence may repeat the at least 2 primary additive colors in the same order for every frame 47, or the predetermined sequence may have the at least 2 primary additive colors in a different order for subsequent frames. If the primary additive colors are Red (R) (18), Green (G) (28) and Blue (B) (48), the predetermined sequence may be, for example RGB (18, 28, 48), RGB (18, 28, 48), RGB (18, 28, 48), . . . . However, the predetermined sequence may be RGB (18, 28, 48), GBR (28, 48, 18), BRG (48, 18, 28), . . . . The predetermined sequence is not random. The color always changes in the immediately subsequent pulse 46, and each frame 47 has a pulse 46 for every primary additive color. It is to be understood, however, that a pulse 46 for a particular primary additive color in a frame 47 may have a duration of zero to achieve the full gamut. Changing the order of the color sequence in adjacent frames may reduce Color Break Up (CBU). CBU is an artifact of Field Sequence Color (FSC) displays that may cause leading and trailing edges of a moving object to appear in rainbow colors.

Each discrete pulse 49 may have only one of the at least 2 primary additive colors. Each discrete pulse 49 may be emitted at a sub-frame rate of at least a product of the frame rate and a total quantity of the at least 2 primary additive colors. In an example of the present disclosure, the at least 2 primary additive colors may be red, green and blue. The total quantity for the example is 3. If the frame rate for the example is 60 Hz, then the sub-frame rate is at least the product of 60 Hz and 3, i.e. at least 180 Hz. In other words, the sub-frames 94 switch colors at a sub-frame rate of at least 180 Hz, and the primary additive colors cycle at a frame rate of 60 Hz.

Figure 6:
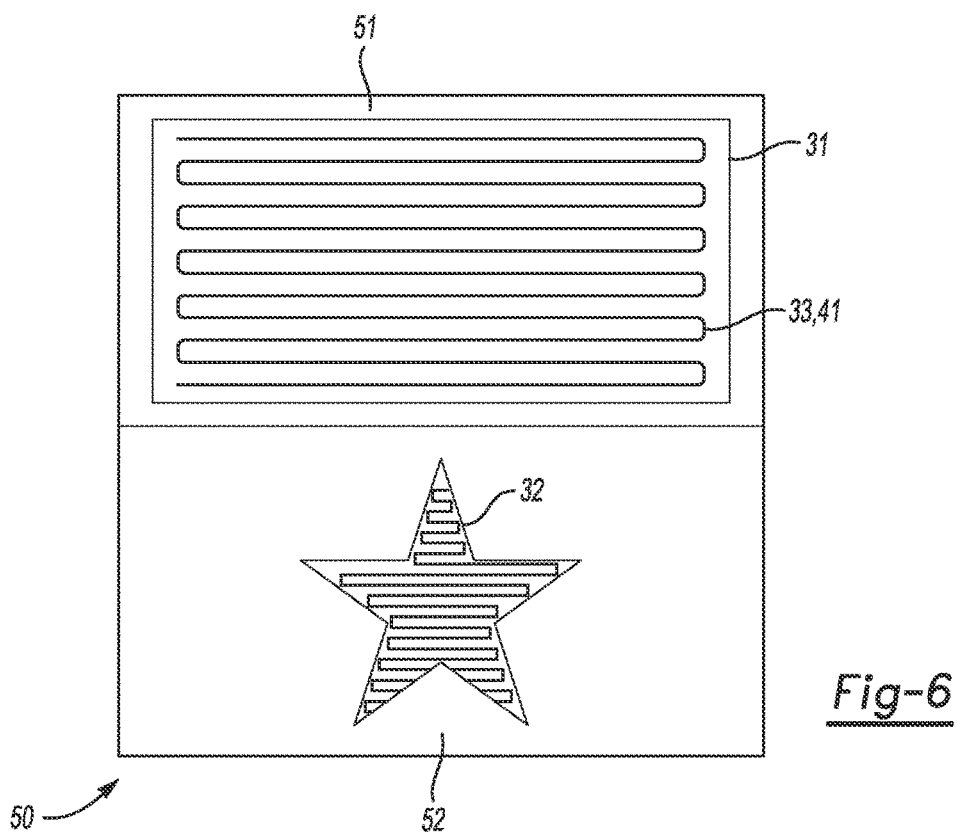
FIG. 6 is a semi-schematic view of an example of a light source to scan at least a first portion of a headlight display section and at least a second portion of a selectively active augmented display section with a beam of the incoherent light according to the present disclosure.
Figure 7:
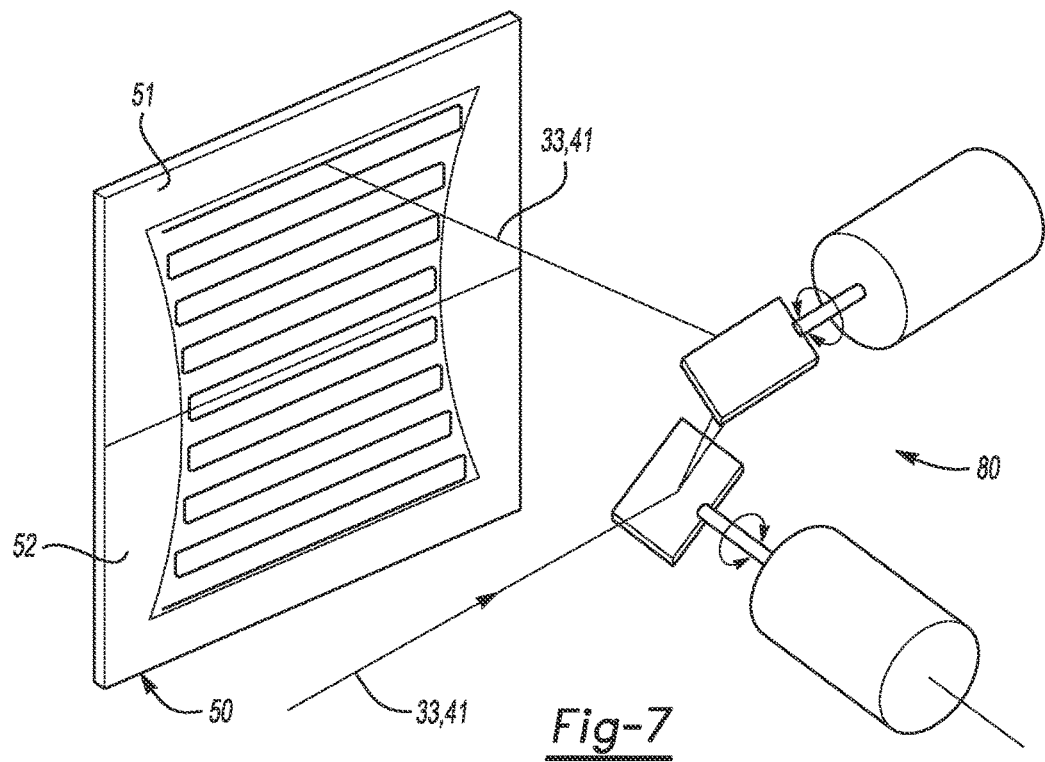
FIG. 7 is a semi-schematic perspective view depicting an example of a two-dimensional beam steering apparatus according to the present disclosure.

In an example of the present disclosure, the laser light source 40 is to project the incoherent light 41 on the entire partitioned display surface 50 simultaneously. (See, for example, FIG. 5.) In another example of the present disclosure, the laser light source 40 may be to scan at least a first portion 31 of the headlight display section 51 and at least a second portion 32 of the selectively active augmented display section 52 with a beam 33 of the incoherent light 41 in each discrete pulse 49. (See, for example, FIG. 6.) The second portion 32 may, for example, be alternating lines of pixels for interlacing. The second portion 32 may be an image defined by vector graphics. The laser light source 40 may include a beam steering device 80 to controllably direct the beam 33 of the incoherent light 41 to the partitioned display surface 50. FIG. 7 depicts a semi-schematic example of a beam steering device 80 scanning the partitioned display surface. In an example, the beam steering device 80 may be a Micro-Electro-Mechanical Systems (MEMS) micro mirror 81 or an Acousto-Optic Modulator (AOM).

Figure 8:
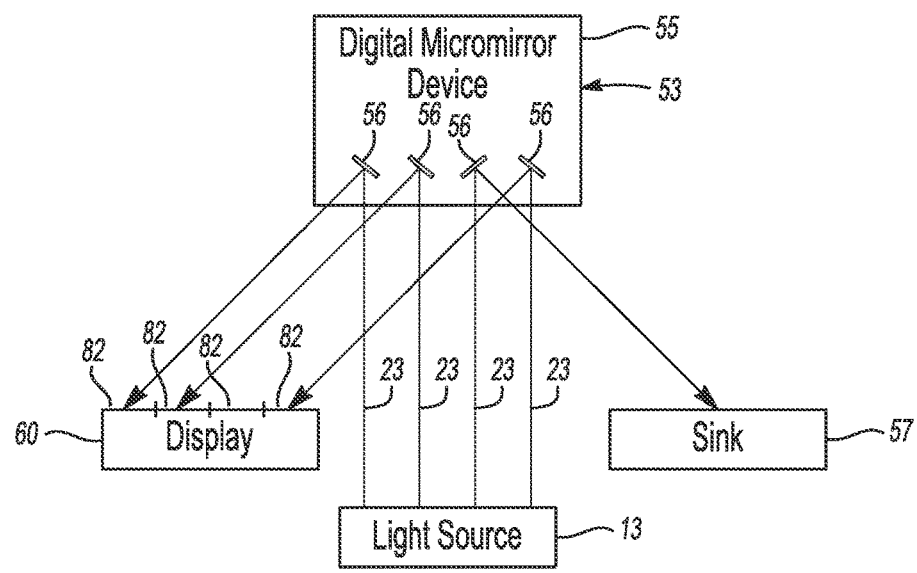
FIG. 8 is a semi-schematic diagram depicting light ray traces for a digital micromirror device according to the present disclosure.
Figure 9:
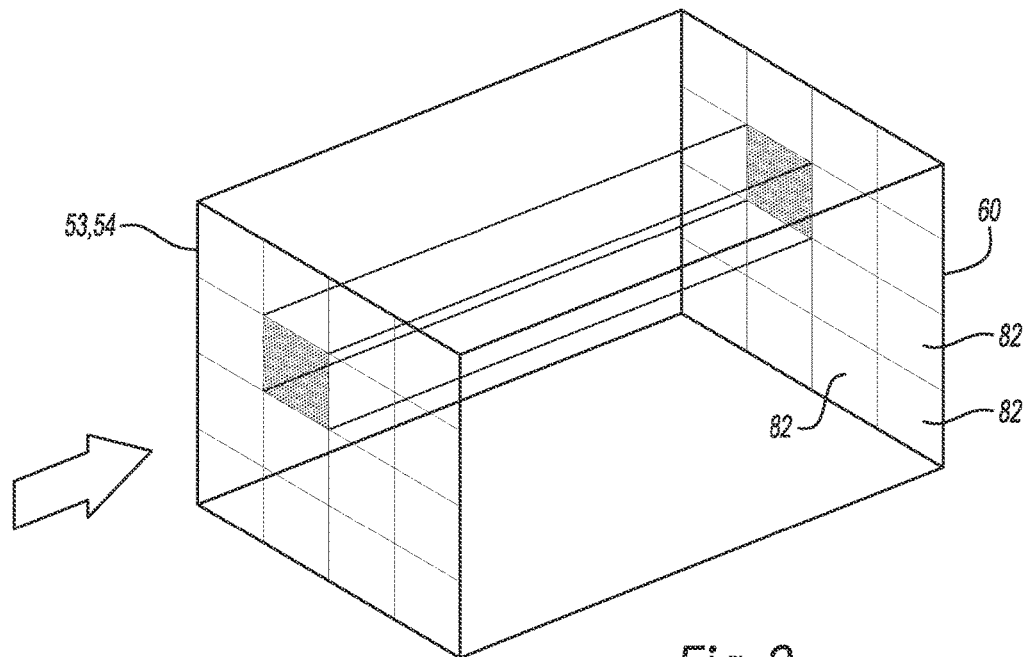
FIG. 9 is a semi-schematic diagram depicting ray traces for an example of a portion of a Micro-Electro-Mechanical Systems (MEMS) shutter array.
Figure 10:
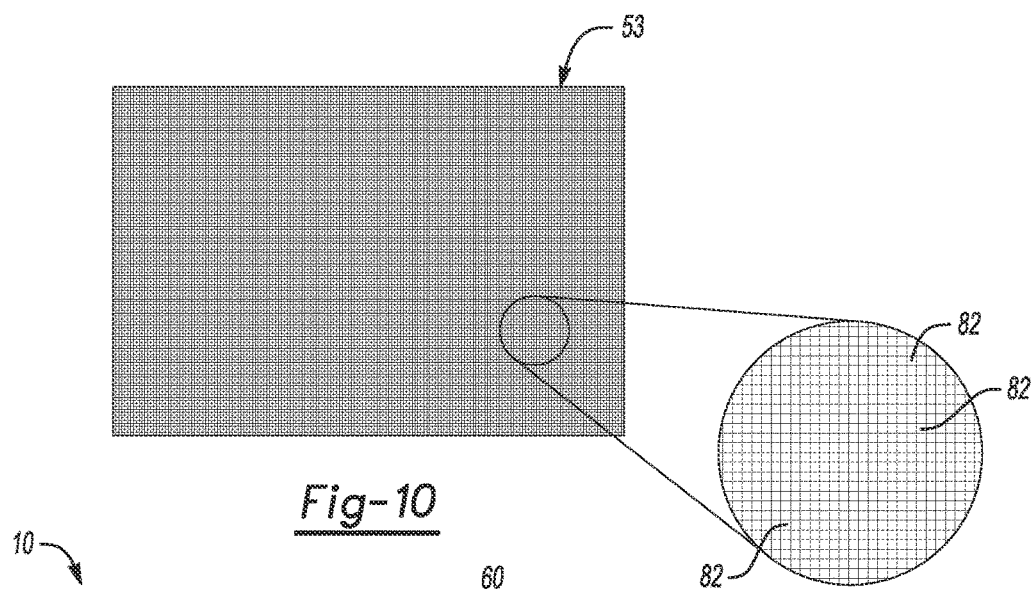
FIG. 10 is a semi-schematic diagram depicting an array of micromirrors with an enlarged portion to show detail.

The partitioned display surface 50 may include a pixel array generator portion 53 to generate the display output 60. In an example of the present disclosure, the pixel array generator portion 53 includes a MEMS shutter array 54 (see FIG. 9) or a digital micromirror device 55 (see FIG. 8). As depicted in FIG. 8, a micromirror 56 directs light 23 for each pixel 82 to either the sink 57 or the display 60. The pixels 82 shown in FIG. 8 and FIG. 9 are enlarged for clarity. The actual size of the pixels 82 may be very small. The pixel array generator portion 53 depicted in FIG. 10 has about 190×130 pixels. Such a pixel array generator portion 53 would therefore have about 24,700 pixels. A pixel array generator portion 53 may be smaller than the array shown in FIG. 10, with more than a million pixels. FIG. 10 is shown with larger than expected pixels 82 to accommodate visibility in printed reproduction of this document.

Figure 5:
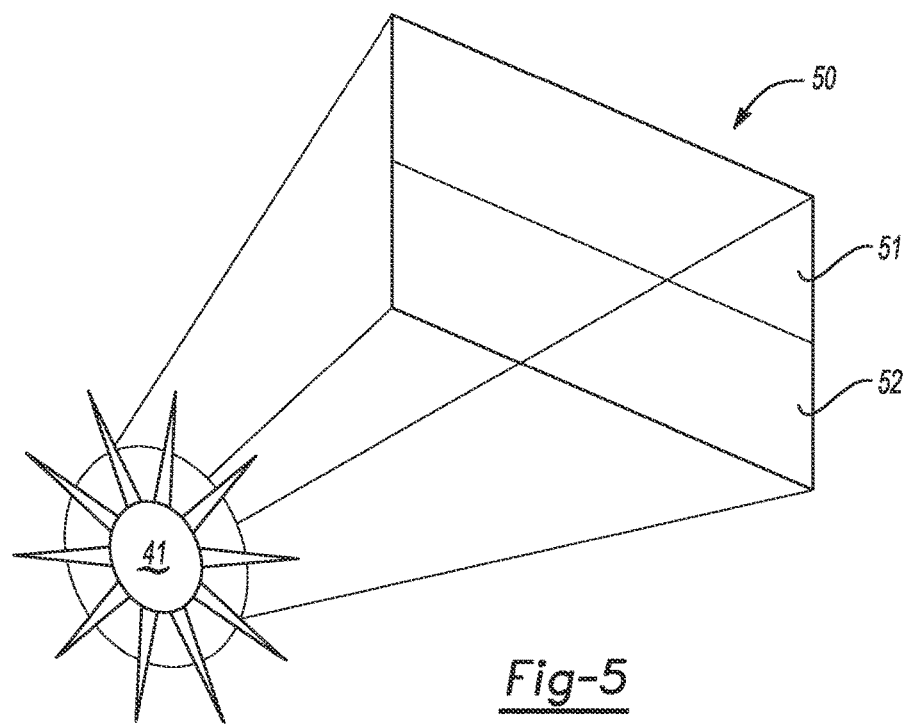
FIG. 5 is a semi-schematic perspective view of an example of a light source illuminating an entire partitioned display surface simultaneously according to the present disclosure.

In an example having the entire partitioned display surface 50 illuminated simultaneously as shown in FIG. 5, the graphical output 78 may be created as follows: For each frame, every pixel has a predetermined color and luminosity. The color and luminosity is regulated by using the pixel array generator 53 to determine a pulse duration for each color subframe. For example, if a pixel is to have the color cyan with medium luminosity for a frame, the following subframes could be used: 50 percent red, 0 percent green, 50 percent blue. Therefore, using the laser light source 40 depicted in FIG. 1, with a frame rate of 60 Hz, and a sub-frame rate of 180 Hz, the red laser diode 25 emits a pulse of red laser light for 5.55 ms, the red phosphor 72 is excited by the red laser light and emits red incoherent light that is directed to the entire partitioned display surface 50. Assuming the pixel array generator 53 is a MEMS shutter array 54, the MEMS shutter array opens all of the pixels that admit light to the headlight display section 51 of the partitioned display surface 50 for the full 5.55 ms sub-frame. The MEMS shutter array 54 opens the pixels that will make cyan color on the selectively active augmented display section 52 with medium luminosity for 2.77 ms, then closes them for the rest of the 5.55 ms sub-frame. Next, the green laser diode 26 emits a pulse of green laser light for 5.55 ms, the yellow-green phosphor 71 is excited by the green laser light and emits yellow-green incoherent light that is directed to the entire partitioned display surface 50. The MEMS shutter array 54 opens all of the pixels that admit light to the headlight display section 51 of the partitioned display surface 50 for the full 5.55 ms sub-frame. Since cyan has no green component, the MEMS shutter array 54 keeps the pixels that make cyan color on the selectively active augmented display section 52 with medium luminosity closed for the entire 5.55 ms sub-frame. Next, the blue laser diode 27 emits a pulse of blue laser light for 5.55 ms, the blue laser light is converted to incoherent blue light by the translucent segment and is directed to the entire partitioned display surface 50. The MEMS shutter array 54 opens all of the pixels that admit light to the headlight display section 51 of the partitioned display surface 50 for the full 5.55 ms sub-frame. The MEMS shutter array 54 opens the pixels that will make cyan color on the selectively active augmented display section 52 with medium luminosity for 2.77 ms, then closes them for the rest of the 5.55 ms sub-frame. Therefore, the headlight display section 51 has full luminosity red, yellow-green, and blue light, generating a frame with a yellowish white light at full luminosity. During the same frame, selected pixels of the selectively active augmented display section 52 will have cyan color with medium luminosity. The optical splitter 70 splits the display output 60 into the headlight illumination output 75, and the graphical output 78. Projection optics 91 direct the headlight illumination output 75 to illuminate the zone 76 with the yellowish white light. The projection optics 91 direct the graphical output 78 as a cyan colored image 77 projected below the zone 76.

In examples of the present disclosure, the optical splitter 70 may be selected from the group consisting of a beam splitter, a motorized projector head, a prism, and a mirror.

In an example of the present disclosure depicted in FIGS. 1-3, the BCM 35 is operatively connected to the partitioned display surface 50, and a vehicle sensory system 37 is operatively connected to the BCM 35. A Graphics Processing Unit (GPU) 92 may be operatively connected between the BCM 35 and the partitioned display surface 50. In the example, the selectively active augmented display section 52 of the partitioned display surface 50 has a display state selected from an active state and a dark state. In the active state, the display output 60 includes the graphical output 78 along with the headlight illumination output 75. In the dark state, the display output 60 does not include the graphical output 78. The display state is automatically selectable by the BCM 35 in response to object distance data 63 obtained by the vehicle sensory system 37.

Figure 11:
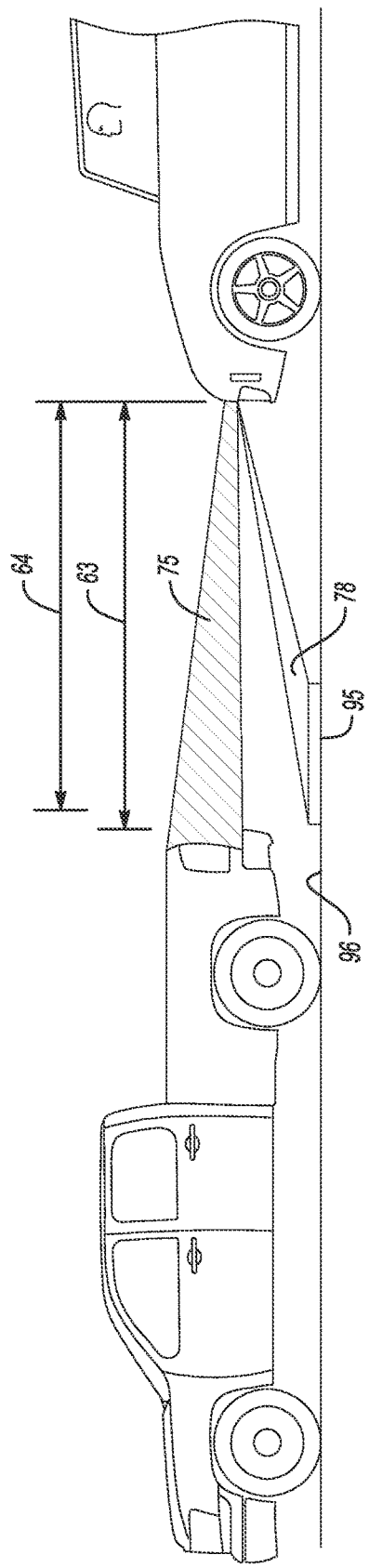
FIG. 11 is a semi-schematic side view depicting a vehicle with a display in an active state according to the present disclosure.
Figure 12:
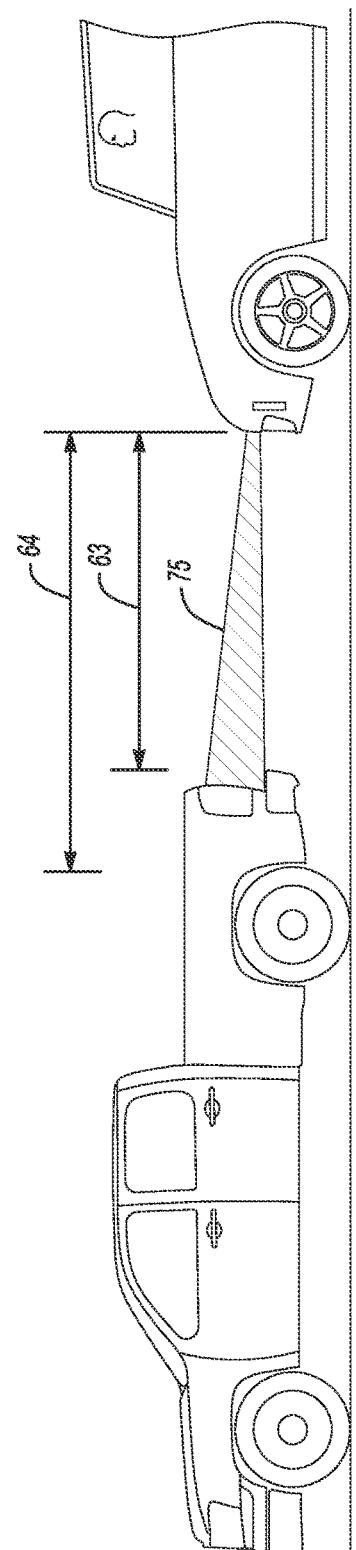
FIG. 12 is a semi-schematic side view depicting the vehicle of FIG. 11 with the display in the dark state according to the present disclosure.

Referring to FIG. 11 and FIG. 12, the dark state may be selected when the object distance data 63 is less than a threshold distance 64. The active state is selected when the object distance data 63 is equal to or greater than the threshold distance 64. FIG. 11 depicts the object distance data 63 being greater than a threshold distance 64. Accordingly, both the headlight illumination output 75 and the graphical output 78 are shown. The graphical output 78 forms a projected image 95 on a reflective surface 96. FIG. 12 depicts the object distance data 63 being less than the threshold distance 64. In FIG. 12, the headlight illumination output 75 is shown, but the graphical output 78 is not shown because the display state is in the dark state.

Figure 13:
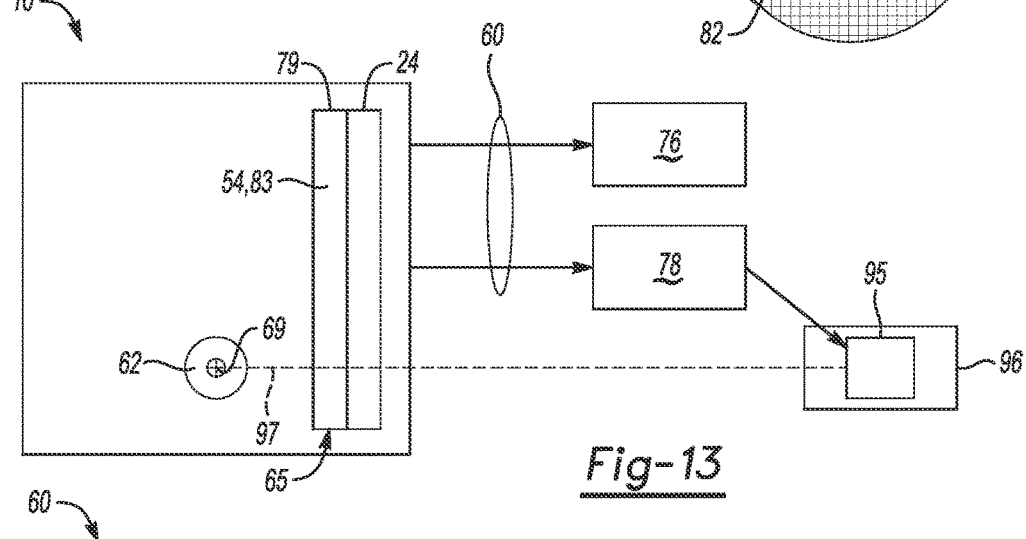
FIG. 13 is a semi-schematic block diagram depicting an example of a vehicle system of the present disclosure including an active shutter system.

As depicted in FIG. 13, examples of vehicle system 10 of the present disclosure may further include an active shutter system 65. The graphical output 78 forms a projected image 95 on a reflective surface 96. In an example, the reflective surface 96 may be a road surface, an animal or object on the road, rain, snow, fog, dust, smoke or any surface that reflects the graphical output toward the human private viewer 62. The active shutter system 65 is between the eyes 69 of the human private viewer 62 and the projected image 95. Dashed line 97 indicates that the human private viewer 62 views the projected image 95 through the active shutter system 65. The dashed line 97 is a schematic line-of-sight.

As depicted in FIG. 13, in examples of the present disclosure, the active shutter system 65 may include a window 79 having transparent media 24 disposed between the display output 60 and the at least one eye 69 of the private viewer 62. The active shutter system 65 may also include a MEMS shutter array 54 or a liquid crystal layer 83 disposed on the transparent media 24. The MEMS shutter array 54 or the liquid crystal layer 83 may have an opaque state and a transparent state. In the opaque state, light is not transmissible through the MEMS shutter array 54 or the liquid crystal layer 83. In the transparent state, light is transmissible through the MEMS shutter array 54 or the liquid crystal layer 83. The MEMS shutter array 54 or the liquid crystal layer 83 enters the opaque state in response to an applied voltage. The MEMS shutter array 54 or the liquid crystal layer is transparent in an absence of the applied voltage.

Figure 14A:
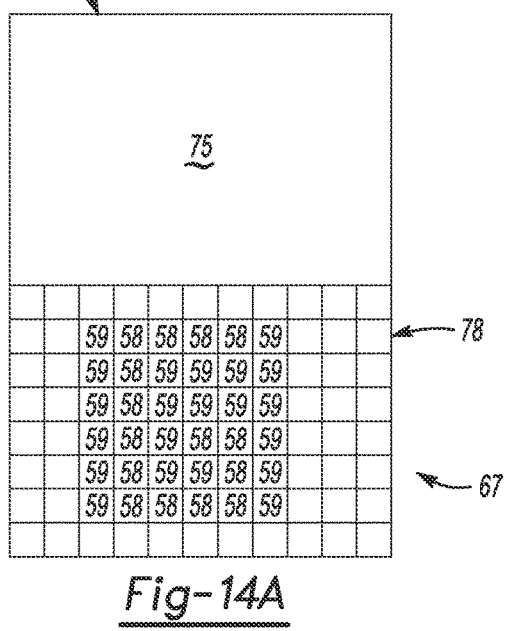
FIG. 14A is a semi-schematic diagram depicting the display output including a private image portion that conveys private information and a mask image portion during a mask interval according to the present disclosure.
Figure 14B:
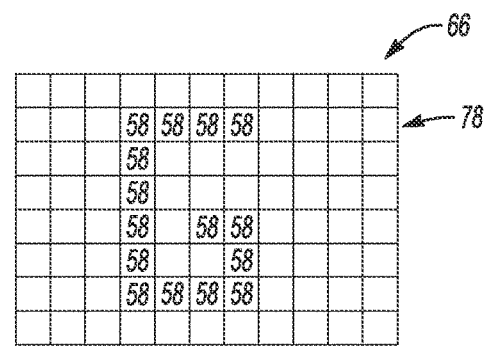
FIG. 14B is a semi-schematic diagram depicting the graphical output portion of the display output from FIG. 14A during the visible interval.

As shown in FIG. 14A, the graphical output 78 portion of the display output 60 includes a private image portion 58 that conveys private information and a mask image portion 59. The graphical output 78 is projected intermittently having visible intervals 66 and masked intervals 67. (See FIG. 14C timing diagram.) For example, each discrete pulse 49 (sub-frame 94) may have a visible interval 66 and a masked interval 67. The mask image portion 59 is projected during the masked intervals 67 to prevent the private information from being discernable to a human observer 68 via the eyes 69 of the human observer 68 unaided by a temporal decryption device. FIG. 14A depicts the private image portion 58 and mask image portion 59 during the masked interval 67. FIG. 14B depicts the private image portion 58 during the visible interval 66. In the visible interval 66, the private image portion 58 is shown with no mask image portion 59. FIG. 14C is a timing diagram depicting the timing of a frame 47 with 3 sub-frames 94 each having a masked interval 67 and a visible interval 66. In FIG. 14C, "ON" is represented by "I" and "OFF" is represented by "O". In FIG. 14C, there is one sub-frame 94 corresponding to each of 3 primary additive colors. In the example depicted in FIG. 14C, the private image portion 58 is "ON" (I) during the visible intervals 67 and the masked intervals 66 for each sub-frame 94. In the example depicted in FIG. 14C, the mask image portion 59 is "ON" (I) during the visible intervals 67 and "OFF" (O) during the masked intervals 66 for each sub-frame 94. In a simple example, the mask image portion 59 may be the same color and intensity as the private image portion 58. In other examples, the mask image portion 59 may have a random color. The private image portion 58 may blend in with mask image portion 59 during the masked interval 67. It is not necessary to project the private information in the private image portion 58 during the masked intervals 67. The active shutter system 65 prevents both the mask image portion 59 and the private image portion 58 from being seen by the private viewer 62 during the masked interval 67. Due to the persistence of images discussed above, the mask image portion 59 appears to viewers other than the private viewer 62 to remain after the masked interval 67 has closed. The private image portion 58 gets lost in the mask image portion 59 without the active shutter system 65 to shield the mask image portion 59 from being seen.

An example of a temporal decryption device is a high speed camera with a shutter and image sensor fast enough to capture the private image portion 58 without capturing the mask image portion 59. Thus, the high speed camera may be a temporal filter that decrypts, or unmasks the private information. However, unless the high speed camera is synchronized with the visible 66 and masked 67 intervals, the probability of intercepting the private information depends on the probability of the shutter being open during the visible interval 66 and closed during the masked interval 67. In examples of the present disclosure, the active shutter system 65 is a temporal decryption device. The active shutter system 65 is synchronized with the visible interval 66 and the masked interval 67 to allow the display output 60 to be optically viewed by a human private viewer 62 during the visible intervals 66 and to eclipse the display output 60 from at least one eye 69 of the private viewer 62 during the masked intervals 67, thereby making the private information discernable to the private viewer 62.

In an example, as depicted in FIG. 15, the window 79 is supported by an eyeglass frame 87 to be worn by the private viewer 62 (see FIG. 13). In another example, as depicted in FIG. 16, the window 79 is supported by a windshield 14 of the vehicle 12. In yet another example, depicted in FIG. 17, the window 79 is rotatably supported by a visor support 15 attached to a body 16 of the vehicle 12. The duty cycle of at least a portion of the MEMS shutter array 54 or the liquid crystal layer 83 may be adjusted to perform conventional visor functions.

Figure 18:
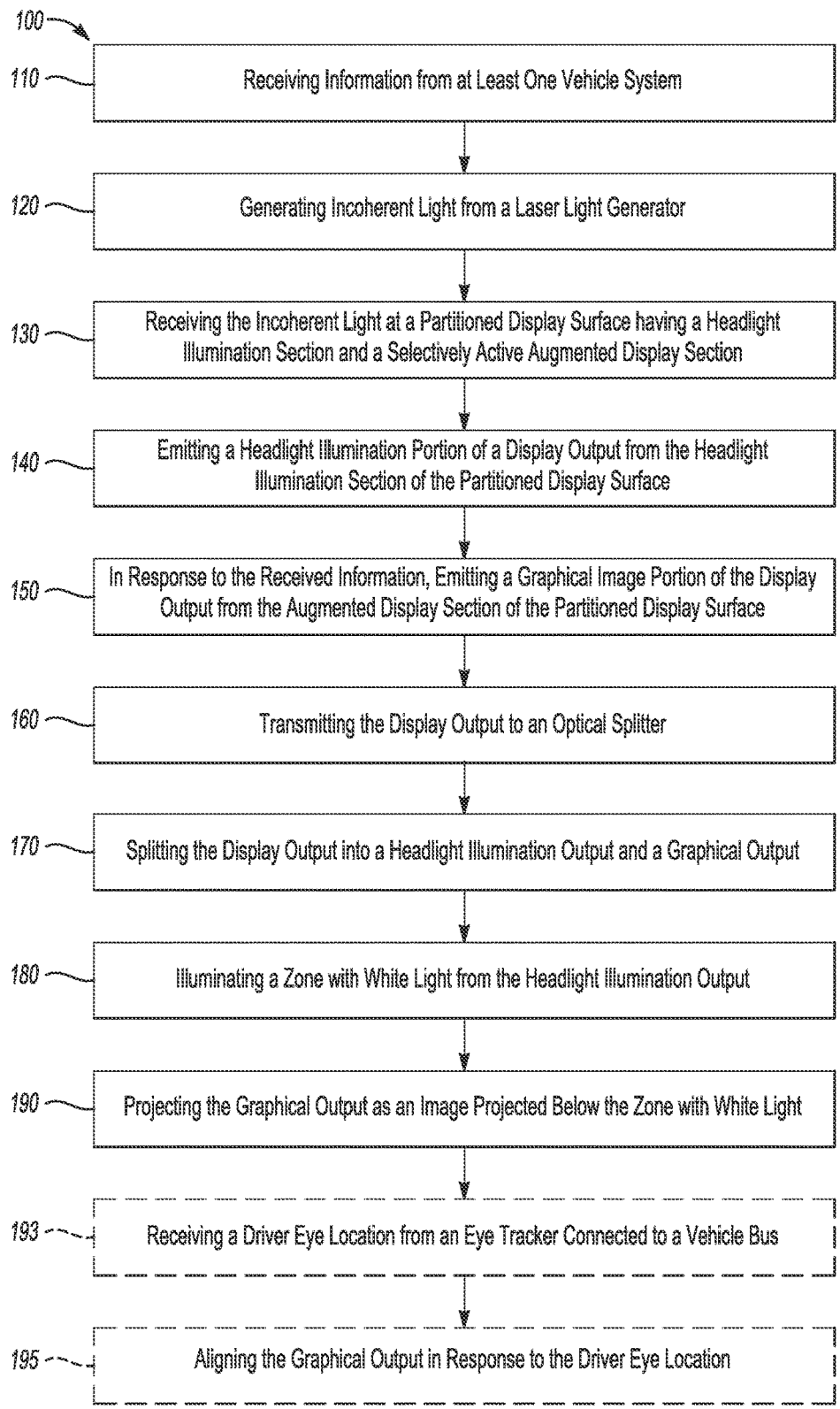
FIG. 18 is a flow chart depicting a method for generating dual output from a vehicle headlight according to the present disclosure.

As depicted in FIG. 18, a method 100 for generating dual output 21 from a vehicle headlight 22 is disclosed herein. FIG. 18 depicts "receiving information from at least one vehicle system" at step 110. "Generating incoherent light from a laser light source having a laser light generator" is at step 120. "Receiving the incoherent light at a partitioned display surface having a headlight illumination section and a selectively active augmented display section," is at step 130. "Emitting a headlight illumination portion of a display output from the headlight illumination section of the partitioned display surface" is at step 140. "In response to the received information, emitting a graphical image portion of the display output from the augmented display section of the partitioned display surface" is at step 150. "Transmitting the display output to an optical splitter" is at step 160. "Splitting the display output into a headlight illumination output and a graphical output" is at step 170. "Illuminating a zone with white light from the headlight illumination output" is at step 180. "Projecting the graphical output as an image projected below the zone with white light" is at step 190.

In examples of the method 100, the incoherent light 41 generated by the laser light source 40 is emitted in a series of frames 47 at a frame rate of at least 60 Hz. Each of the frames 47 may have discrete pulses 49 emitted in a predetermined sequence including at least 2 primary additive colors wherein each discrete pulse 49 has only one of the at least 2 primary additive colors. Each discrete pulse 49 is emitted at a sub-frame rate of at least a product of the frame rate and a total quantity of the at least 2 primary additive colors. In an example, the at least 2 primary additive colors may be red, green, and blue.

As depicted in FIG. 18, the method 100 may further include "Receiving a driver eye location from an eye tracker connected to a vehicle bus" as depicted at step 193. Still further, the method 100 may include "Aligning the graphical output in response to the driver eye location" at step 195.

FIG. 19 shows that when the driver eye location 88, 88' changes (e.g. based on seating position and stature of the driver) the apparent location of the image 77, 77' as viewed through the windshield 14 or the HUD 17 changes. The HUD 17 may be a separate surface from the windshield 14 as depicted in FIG. 19, or the HUD 17 may be displayed directly on a surface of the windshield 14. As shown in FIG. 19, the apparent location of the image 77 as viewed through the windshield 14 associated with a lower eye location 88 is lower than the apparent location of the image 77' as viewed through the windshield 14 associated with the upper eye location 88'. The driver eye location 88 is determined by an eye tracker 19. The eye tracker 19 may, for instance, include a camera connected to a computer to analyze images provided by the camera to determine the driver eye location 88, 88'.

The "Aligning" at step 195 can be by cropping and shifting the image using the pixel array generator 53, or using movable optics 89. FIGS. 20A-20E show an example of cropping and shifting the image by using a sub-array 93 of the total pixels available in the selectively active augmented display section 52 on the pixel array generator 53 and shifting the center of the sub-array 93 up, down, left, right or combinations thereof. An example of movable optics 89 may include a movable prism or lens.

It is to be understood that the ranges provided herein include the stated range and any value or sub-range within the stated range. For example, a range from about 620 nm to about 740 nm should be interpreted to include not only the explicitly recited limits of about 620 nm and about 740 nm, but also to include individual values, such as 625 nm, 680 nm, etc., and sub-ranges, such as from about 630 nm to about 720 nm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A dual output headlight system, comprising:
   a projection system configured to be disposed within an automotive vehicle, the projection system including:
      a laser light source configured to emit incoherent light;
      a partitioned display surface including a headlight display section and a selectively active augmented display section, the partitioned display surface disposed within a first path of the incoherent light and configured to generate a display output;
      a body control module operatively connected to the partitioned display surface; and
      a vehicle sensory system operatively connected to the body control module;
      wherein:
         the selectively active augmented display section of the partitioned display surface having a display state selected from at least one of an active state and a dark state, wherein:
            in the active state, the display output includes graphical output that forms a projected image on a surface exterior to the automotive vehicle;
            in the dark state, the display output does not include the graphical output;
            the display state is automatically selectable by the body control module in response to object distance data obtained by the vehicle sensory system; and
   an optical splitter positioned in a second path of the display output to split the display output into a headlight illumination output and a graphical output.

2. The dual output headlight system as defined in claim 1 wherein the partitioned display surface includes a pixel array generator portion configured to generate the display output.

3. The dual output headlight system as defined in claim 2 wherein the pixel array generator portion includes at least one of a Micro-Electro-Mechanical Systems (MEMS) shutter array or a digital micromirror device.

4. The dual output headlight system as defined in claim 1 wherein the laser light source includes:
   a laser light generator configured to generate laser light; and
   a film layer having a laser light-responsive phosphor deposited thereon, wherein the phosphor is configured to emit the incoherent light in response to excitation by the laser light.

5. The dual output headlight system as defined in claim 4 wherein:
   the laser light source is configured to emit pulses of the incoherent light, wherein:
      the pulses of the incoherent light are discrete pulses of at least 2 primary additive colors,
      the pulses of the incoherent light are emitted in a series of frames at a frame rate of at least 60 Hz, each of the frames having the pulses emitted in a predetermined sequence including the at least 2 primary additive colors,
      each discrete pulse has only one of the at least 2 primary additive colors, and
      each discrete pulse is emitted at a sub-frame rate of at least a product of the frame rate and a total quantity of the at least 2 primary additive colors.

6. The dual output headlight system as defined in claim 5 wherein the at least 2 primary additive colors are red, green and blue.

7. The dual output headlight system as defined in claim 5 wherein:
the laser light source is configured to scan at least a first portion of the headlight display section and at least a second portion of the selectively active augmented display section with a beam of the incoherent light in each discrete pulse; and
the laser light source further includes a beam steering device to controllably direct the beam of the incoherent light to the partitioned display surface.

8. The dual output headlight system as defined in claim 7 wherein the beam steering device is at least one of a Micro-Electro-Mechanical Systems (MEMS) micro mirror or an Acousto-Optic Modulator.

9. The dual output headlight system as defined in claim 1 wherein the laser light source is configured to project the incoherent light on the entire partitioned display surface simultaneously.

10. The dual output headlight system as defined in claim 1 wherein:
the dark state is selected when the object distance data is less than a threshold distance; and
the active state is selected when the object distance data is equal to or greater than the threshold distance.

11. The dual output headlight system as defined in claim 1 wherein the optical splitter is selected from the group consisting of a beam splitter, a motorized projector head, a prism, and a mirror.

12. The dual output headlight system as defined in claim 1 wherein the display output includes the headlight illumination output from the headlight display section and graphical information conveyed by the graphical output.

13. The dual output headlight system as defined in claim 1 wherein the dual output headlight system is configured to illuminate a zone with white light from the headlight illumination output and to project the graphical output as an image projected below the zone with white light.

14. A vehicle system, comprising:
an automotive vehicle;
a body control module operatively disposed within the vehicle;
a vehicle sensory system operatively disposed within the vehicle;
a vehicle bus operatively connecting the body control module and the vehicle sensory system; and
a dual output headlight system responsive to commands from the body control module, the dual output headlight system including:
a laser light source having a laser light generator configured to generate laser light and a film layer having a laser light-responsive phosphor deposited thereon wherein the phosphor is configured to emit incoherent light in response to excitation by the laser light;
a partitioned display surface positioned disposed in a first path of the incoherent light from the laser light source and configured to generate a display output, the partitioned display surface including a headlight illumination section and a selectively active augmented display section wherein:
the partitioned display surface includes a pixel array generator portion configured to generate the display output; and
the selectively active augmented display section is responsive to object distance data obtained by the vehicle sensory system;
wherein:
the selectively active augmented display section of the partitioned display surface having a display state selected from at least one of an active state and a dark state;
in the active state, the display output includes graphical output that forms a projected image on a surface exterior to the automotive vehicle;
in the dark state, the display output does not include the graphical output;
the display state is automatically selectable by the body control module in response to object distance data obtained by the vehicle sensory system, wherein:
the dark state is selected when the object distance data is less than a threshold distance; and
the active state is selected when the object distance data is equal to or greater than the threshold distance; and
an optical splitter disposed in a second path of the display output to split the display output into a headlight illumination output and a graphical output.

15. The vehicle system as defined in claim 14, further comprising an active shutter system wherein:
the graphical output includes a private image portion that conveys private information and a mask image portion;
the private image portion is projected intermittently having visible intervals and masked intervals;
the mask image portion is projected during the masked intervals to prevent the private information from being discernable to a human observer via an eye of the human observer unaided by a temporal decryption device; and
the active shutter system is synchronized with the visible and masked intervals to allow the display output to be optically viewed by a human private viewer during the visible intervals and to eclipse the display output from at least one eye of the private viewer during the masked intervals thereby making the private information discernable to the private viewer.

16. The vehicle system as defined in claim 15 wherein the active shutter system includes:
a window having transparent media disposed between the display output and the at least one eye of the private viewer; and
a Micro-Electro-Mechanical Systems (MEMS) shutter array or a liquid crystal layer disposed on the transparent media wherein:
the MEMS shutter array or the liquid crystal layer has an opaque state and a transparent state;
the MEMS shutter array or the liquid crystal layer enters the opaque state in response to an applied voltage; and
the MEMS shutter array or the liquid crystal layer is transparent in an absence of the applied voltage.

17. The vehicle system as defined in claim 16 wherein the window is supported by an eyeglass frame to be worn by the private viewer.

18. The vehicle system as defined in claim 16 wherein the window is supported by a windshield of the vehicle.

19. The vehicle system as defined in claim 16 wherein the window is rotatably supported by a visor support attached to a body of the vehicle.

20. A method for generating dual output from a vehicle headlight, the method comprising:
    receiving information from at least one vehicle system of an automotive vehicle;
    generating incoherent light from a laser light source having a laser light generator;
    receiving the incoherent light at a partitioned display surface having a headlight illumination section and a selectively active augmented display section, the selectively active augmented display section of the partitioned display surface having a display state selected from at least one of an active state and a dark state;
    emitting a headlight illumination portion of a display output from the headlight illumination section of the partitioned display surface, wherein, in the active state, the display output includes a graphical image portion and, in the dark state, the display output does not include the graphical image portion;
    in response to receiving the information and determining that an object distance is equal to or greater than a threshold distance, emitting the graphical image portion of the display output from the augmented display section of the partitioned display surface;
    transmitting the display output to an optical splitter;
    splitting the display output into a headlight illumination output and a graphical output;
    illuminating a zone with white light from the headlight illumination output; and
    projecting the graphical output onto a surface exterior to the automotive vehicle as an image projected below the zone with white light.

21. The method as defined in claim 20 wherein:
the incoherent light generated by the laser light source is emitted in a series of frames at a frame rate of at least 60 Hz, each of the frames having discrete pulses emitted in a predetermined sequence including at least 2 primary additive colors;
each discrete pulse has only one of the at least 2 primary additive colors; and
each discrete pulse is emitted at a sub-frame rate of at least a product of the frame rate and a total quantity of the at least 2 primary additive colors.

22. The method as defined in claim 21 wherein the at least 2 primary additive colors are red, green, and blue.

23. The method as defined in claim 20, further comprising:
    receiving a driver eye location from an eye tracker connected to a vehicle bus; and
    aligning the graphical output in response to the driver eye location.

* * * * *